US009607177B2

United States Patent
Jejurikar et al.

(10) Patent No.: US 9,607,177 B2
(45) Date of Patent: Mar. 28, 2017

(54) METHOD FOR SECURING CONTENT IN DYNAMICALLY ALLOCATED MEMORY USING DIFFERENT DOMAIN-SPECIFIC KEYS

(71) Applicant: QUALCOMM Incorporated, San Diego, CA (US)

(72) Inventors: Ravindra R. Jejurikar, San Diego, CA (US); Ivan McLean, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 14/042,675

(22) Filed: Sep. 30, 2013

(65) Prior Publication Data

US 2015/0095662 A1  Apr. 2, 2015

(51) Int. Cl.
*G06F 21/78* (2013.01)
*H04L 9/08* (2006.01)
*G06F 12/14* (2006.01)

(52) U.S. Cl.
CPC .............. *G06F 21/78* (2013.01); *G06F 12/14* (2013.01); *H04L 9/08* (2013.01)

(58) Field of Classification Search
CPC ... H04L 63/1458; H04L 63/1416; H04L 9/08; G06F 21/78
See application file for complete search history.

(56) References Cited

U.S. PATENT DOCUMENTS 6,715,085 B2 *  3/2004  Foster ................... G06F 21/575
                                                    713/152
6,851,056 B2 *  2/2005  Evans ................. G06F 12/1483
                                                    710/107
2003/0200451 A1  10/2003  Evans et al.
(Continued)

FOREIGN PATENT DOCUMENTS

EP        2511848 A2      10/2012
WO   WO-2012047200 A1      4/2012

OTHER PUBLICATIONS

International Search Report and Written Opinion—PCT/US2014/058033—ISA/EPO—Jan. 21, 2015.
(Continued)

*Primary Examiner* — Jayesh Jhaveri
*Assistant Examiner* — Wasika Nipa
(74) *Attorney, Agent, or Firm* — Loza & Loza, LLP

(57) ABSTRACT

A method operational within a memory controller is provided for securing content stored in memory. The memory controller may allocate logical memory regions within a memory device to different domains. A different domain-specific key is obtained for each of the different domains, where each domain-specific key is a function of at least a master key and domain-specific information. During write operations, content/data is encrypted, at the memory controller, as it is written into each logical memory region using a domain-specific key corresponding to a domain providing the content and to which the logical memory region is allocated. Similarly, during read operations, content/data is decrypted, at the memory controller, as it is read from each memory region using a domain-specific key corresponding to a domain requesting the content and to which the logical memory region, where the content is stored, is allocated.

29 Claims, 11 Drawing Sheets

(56) References Cited

U.S. PATENT DOCUMENTS

| | | |
|---|---|---|
| 2003/0200454 A1 | 10/2003 | Foster et al. |
| 2007/0143632 A1* | 6/2007 | Matsuzaki .......... G06F 21/6218 |
| | | 713/193 |
| 2008/0107275 A1* | 5/2008 | Asnaashari ............. G06F 21/80 |
| | | 380/281 |
| 2012/0198538 A1 | 8/2012 | Spring et al. |
| 2012/0257743 A1* | 10/2012 | Van Der Veen .... G06F 21/6218 |
| | | 380/44 |
| 2012/0272073 A1 | 10/2012 | Donie et al. |
| 2013/0036312 A1 | 2/2013 | Anquet et al. |
| 2013/0073870 A1 | 3/2013 | Sauerwald et al. |

OTHER PUBLICATIONS

Shi W., et al., "Memory-Centric Security Architecture," High-Performance and Embedded Architectures and Compilers, 2005, LNCS 3793, pp. 153-168.

* cited by examiner

METHOD FOR SECURING CONTENT IN DYNAMICALLY ALLOCATED MEMORY USING DIFFERENT DOMAIN-SPECIFIC KEYS

BACKGROUND

Field

Various features relate to methods for securing (scrambling/encrypting) content in memory by using different domain-specific keys for different memory regions.

Background

Memory space in a device or system is typically shared among different applications, functions, and/or devices, which are collectively referred hereto as "domains". A domain comprises of one or more master (e.g., hardware and/or software block, modules or sub-systems with a specific identity) that generate memory requests. For an allocated memory space, an access control mechanism is typically implemented that controls read/write operations by the different masters in the system. For example, in a system-on-chip (SoC) access control serves to control read/write operations of the various masters resources within the SoC (e.g. Application CPU cannot access the code/data used by an audio sub-system, etc.) to the slave resource (e.g., a memory accessed by various masters). A domain is effectively defined by the access control setting permitting a given set of masters access to the slave resources (memory), and the masters permitted access can be referred to as a master within the domain. The memory is considered to be made up of multiple contiguous regions and each region may be associated with access control properties that grant one or more masters read and/or write access to the memory region. The allocated memory region along with the access control settings for the various masters constitute a "domain" in the system. Changing the access control settings is effectively changing from one domain to another.

Dynamic memory allocation is commonly used by a high-level Operating System (HLOS) to efficiently use the memory regions (e.g., memory pages in a system) to support virtual memory.

In such a system, a memory page may be shared over time between two domains, such as an untrusted domain and trusted domain. When there is a change in ownership (or domain), the domain change for the memory is reflected by changing the access control for the memory region (e.g., memory page).

Additionally, scrambling/encryption may be implemented in memory (e.g., off-chip memory) as a security feature to protect content stored in memory. Scrambling protects the memory contents from physical attacks such as probing the signals/interface lines and interposer boards. Further enhancements can be achieved to protect from physical attacks (e.g., glitching the memory interface lines). The scrambling functionality is typically performed in the memory controller (e.g., a memory controller within a SoC). A global random key is typically set-up during the boot-up and used for scrambling the contents written to memory and de-scrambling them when the contents are read out from memory. The scrambling logic is typically dependent on the address of the memory location (e.g., the same data written to different addresses are encrypted differently). Current approaches to security use the same global random key to secure content stored in all memory regions. Additionally, access control and content security (scrambling/encryption) are separate and distinct functions.

A first security risk occurs when access control changes for a memory region (e.g., set of pages) when the memory is allocated to a different domain. To prevent a master (e.g., untrusted master) in the new domain from gaining access to content stored by a previous domain-master (e.g., trusted master) in the reallocated memory region, the reallocated memory region is often cleared, overwritten (e.g., with known/random values), or scrambled when access changes from the previous master to the new master. This consumes both time and energy and is an expensive operation.

A second security risk is also possible where the same physical memory can be accessed by different masters (over time), giving an untrusted master (i.e., hacker) an opportunity to build tables (e.g., known patterns) that can be exploited for the same memory regions. For instance, because the untrusted master (hacker) has access to the clear (unencrypted) and encrypted data for specific memory addresses, it can build the tables (e.g., using known instructions, patterns, etc.) that map between encrypted and unencrypted content. With that information, these mapping tables can assist in successful glitching attacks on a memory region when a different master has access control to that memory region.

A third security risk exists where encryption keys may be generated by software that is susceptible to attackers.

A fourth security risk may also exist where, even if a memory controller is reset, data may not be cleared from memory regions. Therefore such data is accessible by unauthorized entities. This typically occurs, as resetting the memory controller resets the access control, and the default access control settings permit access to all masters in the system. Such reset attacks compromise the system security.

Consequently, a solution is needed that mitigates or prevents unauthorized access to content in allocated and/or shared memory regions.

SUMMARY

A method operational within a memory controller is provided for securing content stored in memory. Logical memory regions are statically or dynamically allocated within a memory device to different domains. A different domain-specific key is obtained for each of the different domains, where each domain-specific key is a function of at least a master (global) key and domain-specific information. Content written into each logical memory region may be encrypted using a domain-specific key corresponding to all masters within the domain having access to the content and to the specific domain to which each logical memory region is allocated. Content read from each logical memory region may be decrypted using a domain-specific key corresponding to all masters within the domain requesting the content and to a domain to which each logical memory region, where the content is stored, is allocated.

In one example, access to a first logical memory region may be restricted to only a first master associated with a first domain to which the first memory region is allocated.

A first logical memory region may be dynamically reallocated from a first domain to a second domain, where the first domain and second domain are associated with different domain-specific keys. Reallocation of the first logical memory region from the first domain to the second domain may be done without clearing content from the first logical memory region.

BRIEF DESCRIPTION OF THE DRAWINGS

Various features, nature and advantages may become apparent from the detailed description set forth below when

FIG. 5, comprising

DETAILED DESCRIPTION

Figure 1:
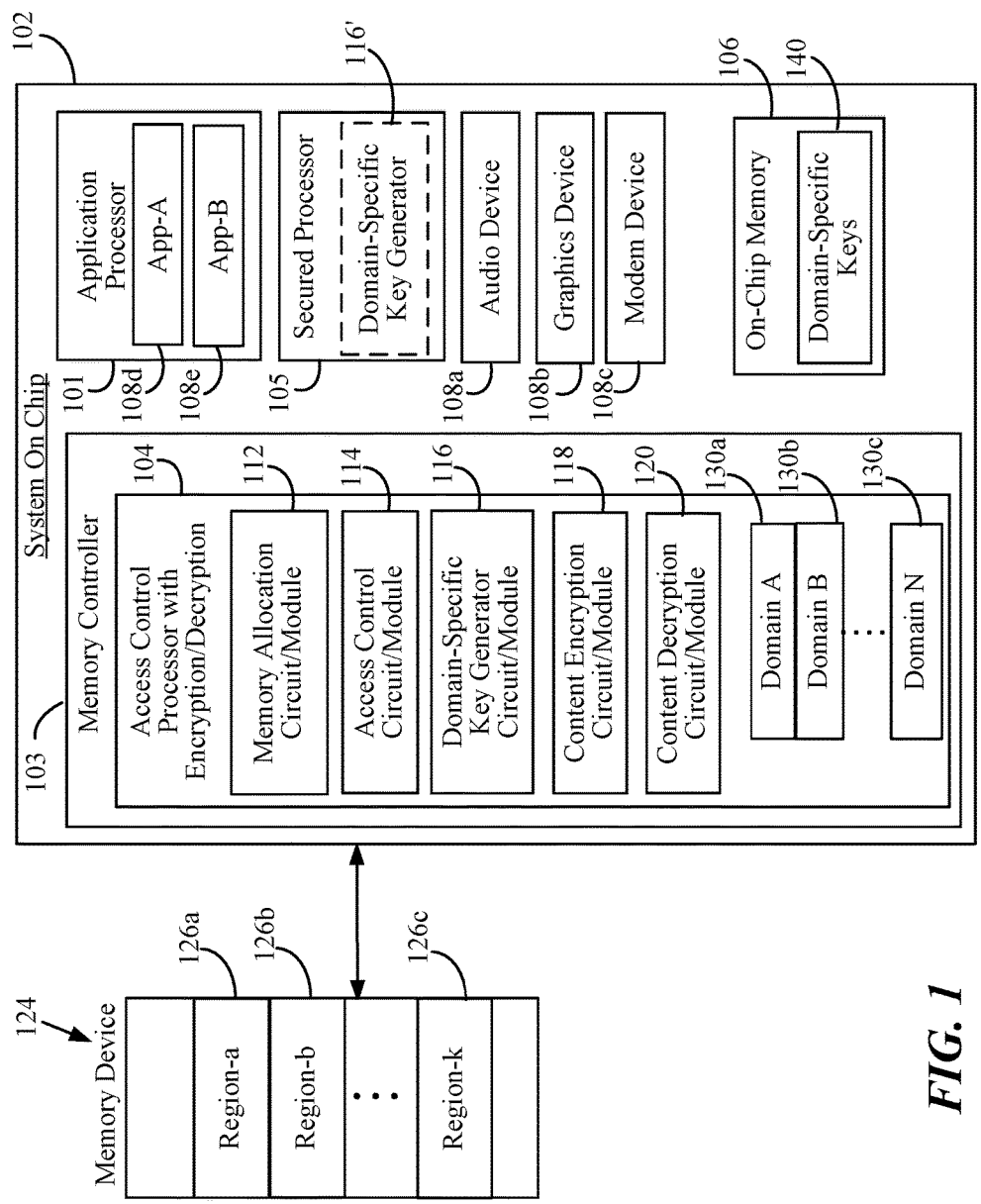
FIG. 1 illustrates an exemplary system having a system on a chip (SoC) and an external memory device.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

To protect access to memory regions associated with different domains, one feature combines the access control function and security function within a memory controller to secure (e.g., encrypt) data stored within each memory region using distinct domain-specific keys. Thus, there is inherent protection of memory as memory is dynamically allocated to different domains (each domain has different access control setting, which defines the domain). Because encryption/decryption of data is performed at the memory controller level, the encryption/decryption system is not exposed to software hacking.

Another aspect provides for further protecting encrypted data within memory regions from an access control block reset attack by automatically changing domain-specific keys upon reset of the access control block, even when a global key is retained. Thus, previous domain-specific keys cannot be used to decode subsequently stored data in the same memory region. Restoring the correct access control settings for a domain (i.e., prior to a reset) requires regenerating the same domain-specific key in order to access the correct plaintext data.

Another aspect provides for including, at least partially, hardware-accessible only information as an input to a key derivation function to generate each domain key, thereby preventing any software attack from being able to generate such domain key.

Yet another aspect provides for a key derivation function that generates each domain key by obtaining inputs from two or more independent entities (e.g., two or more independent roots of trust) in a mutually co-operative manner. For instance, an application processor (e.g., first master) and/or a secured processor (e.g., second master) may both contribute information as inputs to a key derivation function. Consequently, domain key ownership is not given to any one entity or the other.

In yet another aspect, where a key derivation function is implemented in software (e.g., executed by a secured processor), each domain key may be generated based on, at least partially, an input provided by a master (within the domain) with which the domain key is associated. Consequently, domain key ownership is not given to any one entity or the other.

According to yet another aspect, a domain may be comprise of multiple masters, wherein the memory regions allocated to the domain is shared between two or more masters by using a shared domain key to encrypt such data. However, note that a given master can be in multiple domains, and the appropriate domain key is used when accessing the memory allocated to a domain. Note that a master may also have its own private data, which is in a separate and/or different domain protected by a different domain-specific key (and other masters cannot access this private data).

Exemplary Operating Environment for Domain-Specific Keys

FIG. 1 illustrates an exemplary system having a system on a chip (SoC) 102 and an external memory device 124. The SoC 102 may include an application processor 101, a secured processor 105, a memory controller 103, a plurality of devices 108a-c, and/or on-chip memory 106. In one example, these devices may include an audio device 108a (e.g., audio processor/circuit, audio driver, etc.), a graphics device 108b (e.g., graphics processor/circuit, graphics driver, etc.), and/or a modem device 108c (e.g., modem processor/circuit, etc.). The application processor 101 and/or the security processor 103 may execute one or more applications, such as App-A Domain 108d and/or App-B Domain 108e. Each of the devices 108a-c (e.g., modules, circuits, and/or other resources) and/or applications 108d and 108e may be considered a "master". A "master" may be associated with a domain to which memory space is statically or dynamically allocated or assigned. In one example, a "domain" 130a, 130b, and/or 130c may be associated with a memory region allocation by setting the access control for one or more masters (associated with the domain) according to the access control policies for each of the masters. That is, the access control settings and/or memory region allocation define a domain.

The memory controller 103 may be a circuit that implements an access control processor with encryption/decryption 104. The access control processor with encryption/decryption 104 may include a dynamic memory allocation circuit/module 112, an access control circuit/module 114 (e.g., to process or route read and/or write operations, store/delete content from restrict access to memory regions, etc.), a domain-specific key generator circuit/module 116 (e.g., to generate domain-specific encryption/decryption keys), a content encryption circuit/module 118 (e.g., to encrypt content/data written into memory allocated to a domain using a corresponding domain-specific key), and/or a content decryption circuit/module 120 (e.g., to decrypt content/data read from memory allocated to a domain using a corresponding domain-specific key). The memory allocation circuit/module 112 may serve to allocate a (logical or physical) memory region 126a, 126b, and/or 126c within the external memory device 124 to one or more domains 130a, 130b, and/or 130c. The access control circuit/module 114 may serve to control which master(s) is able to access (e.g., read/write operations) an allocated memory region 126a, 126b, and/or 126c, effectively defining the domain 130a, 130b, and/or 130c for the memory region. The domain-specific key generator circuit/module 116 may generate a unique domain-specific key (e.g., encryption/decryption key) for each domain 130a, 130b, and/or 130c. Such domain-specific keys 140 may be generated, for example, from a global key, hardware-specific information, and/or other domain-specific information, and then stored within the secured on-chip memory 106. The content encryption circuit/module 118 may serve to encrypt content, to be written into a memory region associated with a domain, using a corresponding domain-specific key during write operations. Similarly, the content decryption circuit/module 120 may serve to decrypt content, to be read from a memory region associated with a domain, using a corresponding domain-specific key during read operations by any master within the domain.

In some implementations, the domain-specific keys may be generated within the memory controller 103 (e.g., by a key derivation function implemented by the key generator circuit/module 116), thereby making the encryption/decryption of data written to or read from the memory device 124 transparent and inaccessible to software (operating in the application processor 101 and/or the secured processor 105). For instance, software operating on the application processor 101 has no access to the domain-specific keys. Consequently, the security of the data/content stored in the memory device 124 (e.g., memory regions allocated to one or more domains) cannot be compromised.

In other implementations, the secured processor 105 may implement the key derivation function within a domain-specific key generator 116' (in software). However, the secured processor 105 may be inaccessible to user controlled applications (which typically run on the application processor 101), thereby inhibiting an attacker's access to the domain-specific keys.

Note that, by using domain-specific encryption keys, there is no need to clear, overwrite, or scramble a memory region 126a, 126b, and/or 126c when it is reallocated from a first domain to a second domain because each domain is using a different encryption key. Therefore, the key used to encrypt/decrypt content in a given memory region changes when access control changes. This saves time and power (energy) in the system 102. Additionally, this technique also prevents using tables generated from one access control setting region in another (different) access control settings for a region, even when the same physical memory region is shared over time. This makes the system more secure since no access control information is shared across domains.

Exemplary Methods for Generating Domain-Specific Keys

Figure 2:
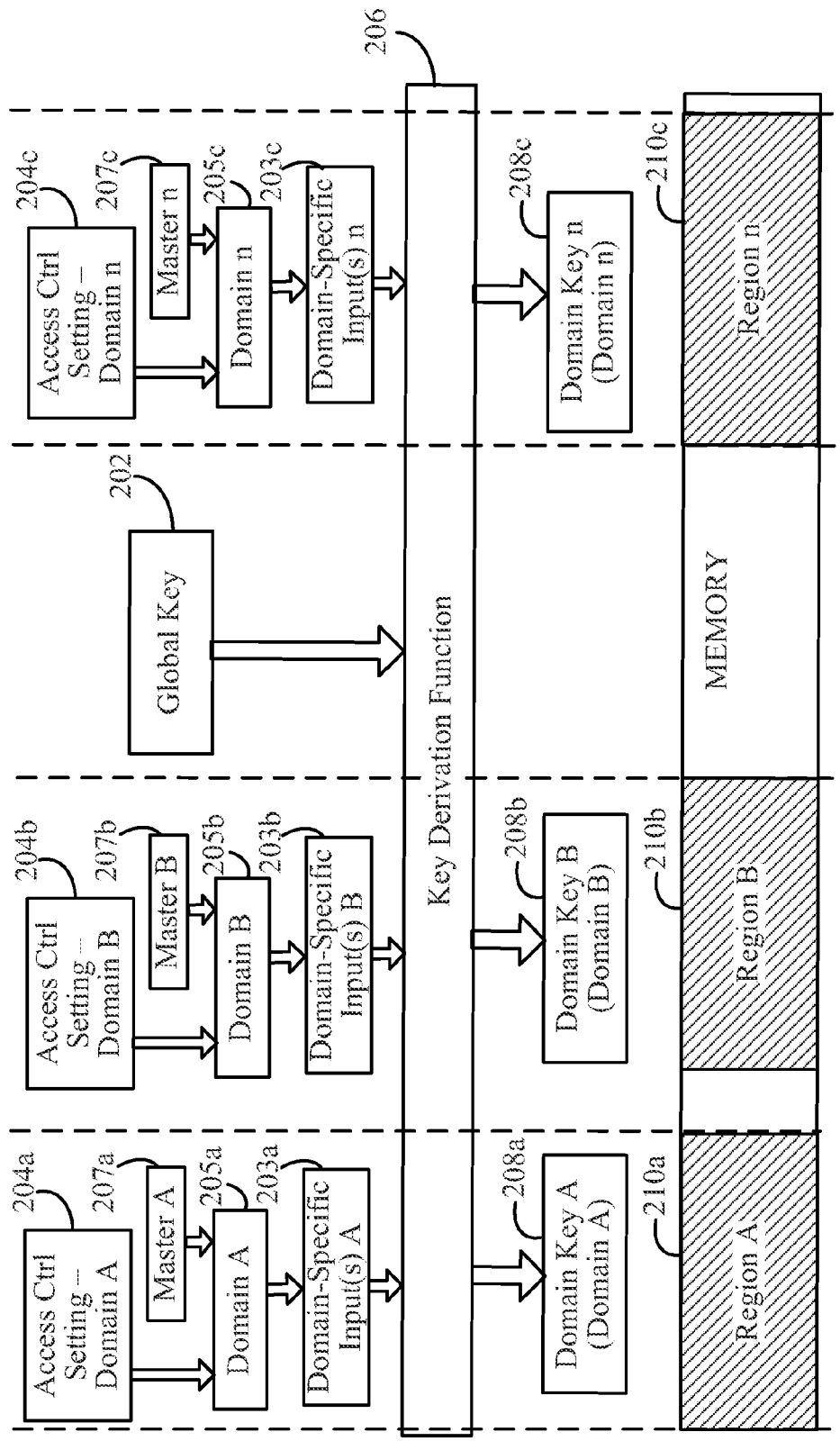
FIG. 2 is a block diagram illustrating one example of how domain-specific keys are generated and used on different memory regions.

FIG. 2 is a block diagram illustrating one example of how domain-specific keys are generated and used on different memory regions. Here, a domain 205a, 205b, and/or 205c is defined by a memory region allocation 210a, 210b, and 210c, one or more masters 207a, 207b, and/or 207c associated with the domain according to the access control settings (i.e., policies) 204a, 204b, and/or 204c for each of the masters of a domain. A single global key 202 and/or a domain-specific input 203a, 203b, 203c, and key derivation function 206 may be used to generate distinct domain keys 208a, 208b, 208c associated with each domain. The distinct domain keys 208a, 208b, 208c (i.e., domain-specific keys) may be used with corresponding different (logical or physical) memory regions 210a, 210b, and 210c associated with the different domains. When a particular master 207a, 207b, and/or 207c seeks to perform a read/write operation, the access control setting 204 for its corresponding domain 205a, 205b, and/or 205c is used (e.g., the corresponding domain key is used for encrypting/decrypting content from the associated memory region).

When the domain-specific keys are generated at the memory controller (e.g., in hardware), a domain-specific key 208 may be generated based on, for example, a single global key 202 and the key derivation function 206. That is, since the domain-specific keys are being generated in hardware, there is no chance of tampering and the use of domain-specific inputs 203 to generate the key may be optional. By contrast, when the domain-specific keys are generated by software (e.g., in secured processor 105 of FIG. 1), domain-specific inputs 203a, 203b, and/or 203c may be used in addition to the single global key 202 to generate the distinct domain keys 208a, 208b, 208c. This minimizes the risk of a software-based attack since a domain key cannot be generated without information known only to each specific domain.

The memory device 124 (FIG. 1) may be segmented into a plurality of memory regions 210a, 210b, and 210c. In one example, each memory region 210a, 210b, and 210c may be allocated to a different domain 205a, 205b, and 205c, respectively. In the example of FIG. 2, each domain (i.e., Domain A 205a, Domain B 205b, and Domain C 205c, may have a single master (i.e., Master A 207a, Master B 207B, and Master n 207c, respectively).

According to one aspect, a master may be part of two or more different domains. In such case, a different domain-specific key is used by each domain even though the same master is part of each of the domains. For example, when a first master accesses data in a first memory region associated with a first domain, the access control process within the memory controller uses a first domain-specific key to read/write data on behalf of the first master. When the first master accesses data in a second memory region associated with a second domain, the access control process within the memory controller uses a second domain-specific key to read/write data on behalf of the first master.

According to one aspect, while a master may be associated with a domain, the master does not have direct access or control of the domain-specific key. Instead, domain-specific keys are generated, maintained, and/or controlled exclusively by the access control processor of the memory controller.

In yet another aspect, a domain may have multiple masters that share a domain-specific key.

Figure 3:
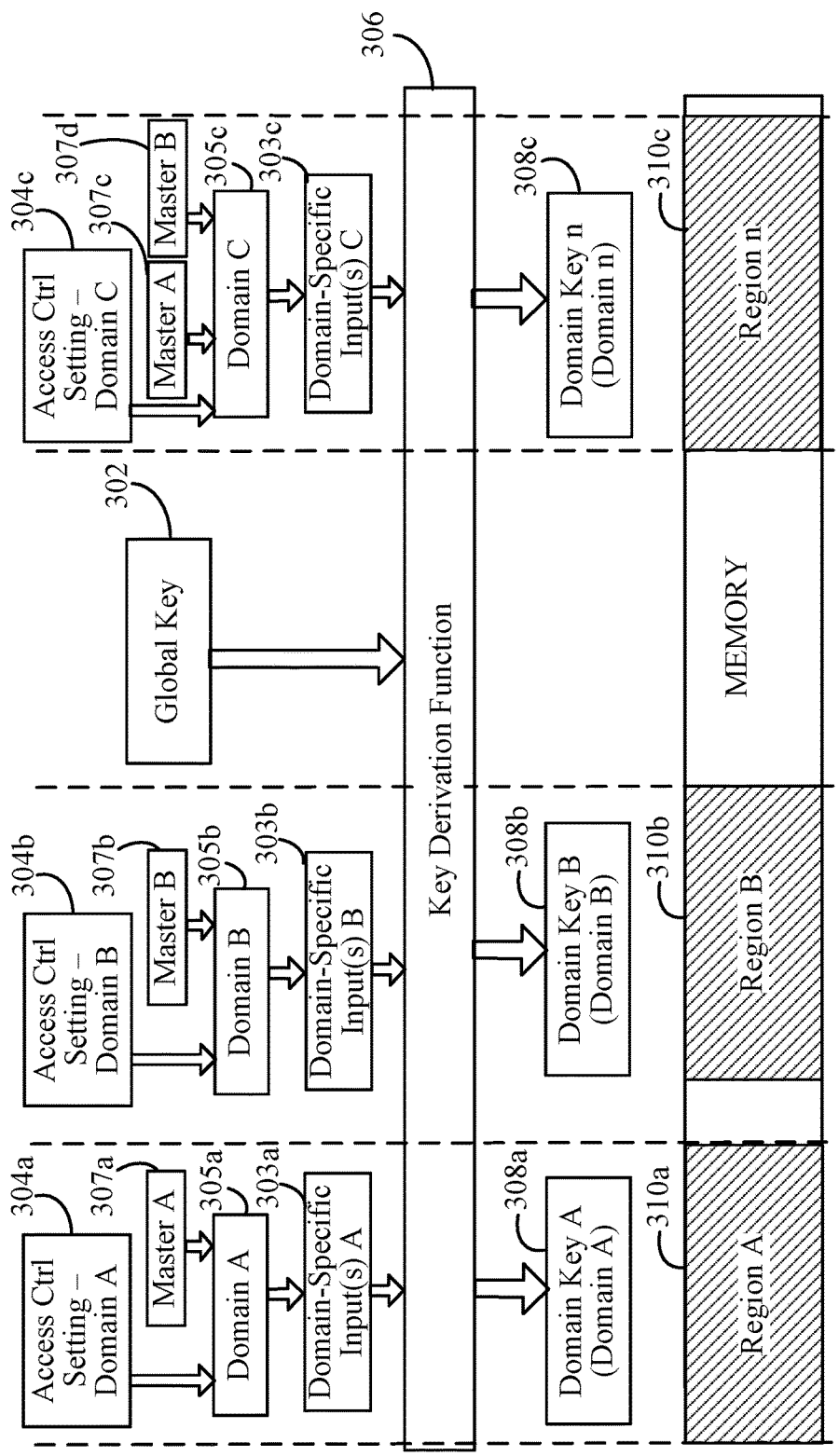
FIG. 3 illustrates another example in which a domain key for a shared memory region (accessed by multiple masters) may be generated.

FIG. 3 illustrates another example in which multiple masters maybe associated with a domain. As in FIG. 2, each domain 305a, 305b, and/or 305c may be defined by a memory region allocation 310a, 310b, and/or 310b, one or more masters 307a, 307b, 307c, and/or 307d associated with the domain, and/or access control settings (i.e., policies) 304a, 304b, and/or 304c for each of the masters of a domain.

A single global key 302 and/or domain-specific input 303a and 303b, and key derivation function 306 may be used to generate distinct domain keys 308a and 308b associated with different memory regions 310a (for Domain A) and 310b (for Domain B), respectively. However, a domain C 305c may include a memory region 310c and multiple masters, i.e., Masters A & B 307c and 307d. For this purpose, a shared domain key 308c may be generated using the single global key 302 and/or domain-specific inputs 303c. This allows multiple masters 307c and 307d to share a memory region for a domain and/or data stored therein, while still securing such data from others.

Exemplary Master-Side & Slave-Side Access Control

One form of memory access control is referred to as slave side access control and is usually performed on the physical address of memory.

Another form of memory access control is referred to as master side access control and is usually performed by memory management units (MMU). The MMU is responsible for virtual-to-physical memory address translation and is usually implemented by translation page tables. In addition to address translation, page tables can have additional access control setting (e.g., by specifying read/write permissions at a page level granularity). Different masters can be associated with different sets of page tables to accomplish a fine-grained master side access control.

Figure 4A:
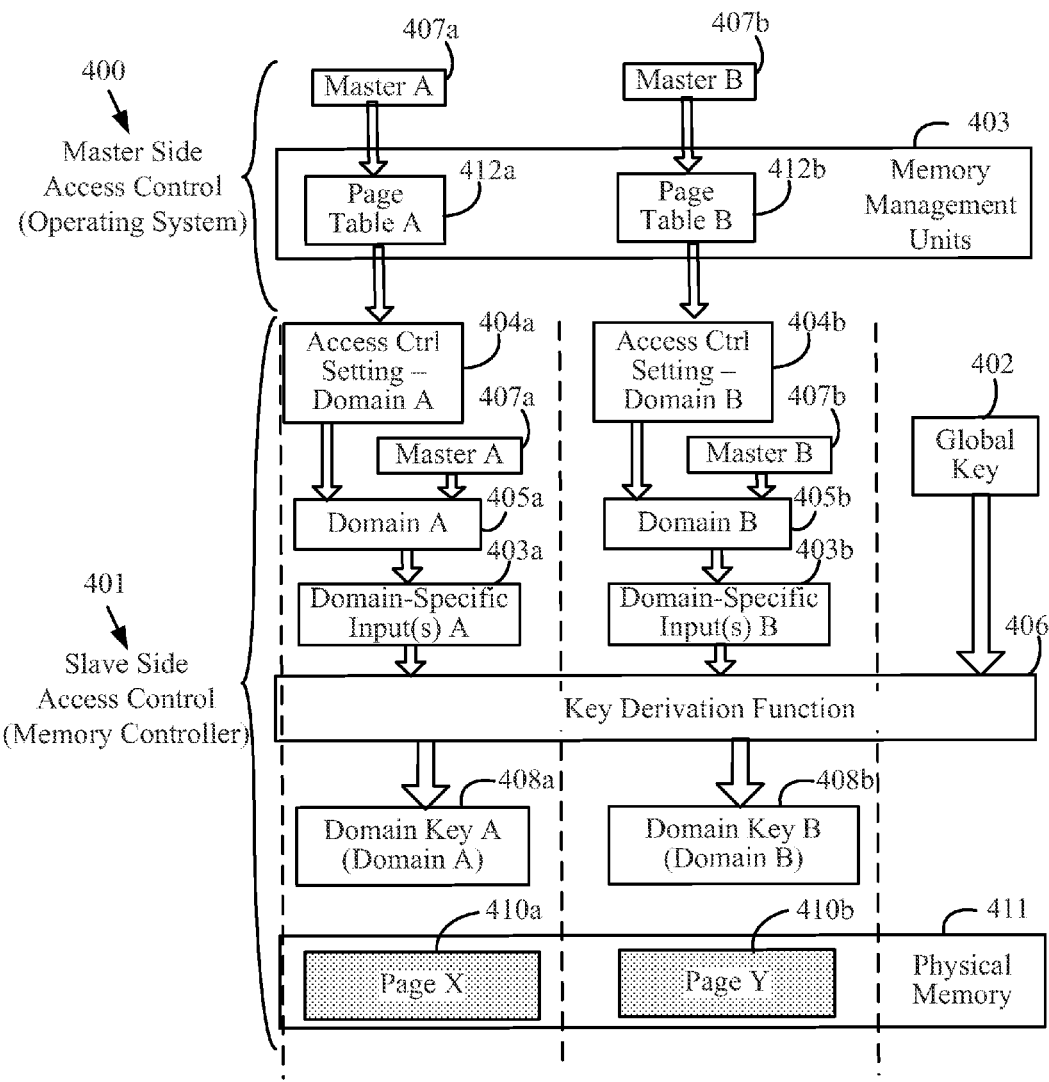
FIG. 4A illustrates a first example of how master side access control and slave side access control may be combined to design a flexible and scalable access control system.

FIG. 4A illustrates a first example of how master side access control 400 and slave side access control 401 may be combined to design a flexible and scalable access control system. The master side access control 400 may be performed, for example, by an operating system and/or application where memory management units 403 define page tables 412a and 412b for each master 407a and 407b. The page tables 412a and 412b may perform, for example, virtual-to-physical memory address translation and access control setting (e.g. specify read/write permissions at a page level granularity). For instance, different masters 407a and 407b can be associated with different page tables 412a and 412b to accomplish a fine-grained master side access control.

In the slave side access control 401, like in FIG. 2, each domain may have its own control settings 404a and 404b. A single global key 402 and/or domain-specific input 403a and 403b, and key derivation function 406 may be used to generate distinct domain keys 408a and 408b associated with different memory pages 410a (for Domain A) and 410b (for Domain B), respectively, within the same memory region 411. This aspect may permit shared memory regions by different domains, where some memory pages in a region are allocated to a first domain and a different set of pages in the memory region are allocated to a second domain.

In this example of combined master side and slave side access control, to grant access to a particular memory page 410a or 410b, an access request has to be permitted by both the master side access control 400 (e.g., as specified by the page tables in MMU 403) as well as the slave side access control 401 (e.g., memory controller access control settings. Note that a master's identifier (ID) can still be propagated to the slave side access control for further permission checking. Note that master and slave side access control can be combined to form/specify a fine grained domain and have related domain-specific keys.

Figure 4B:
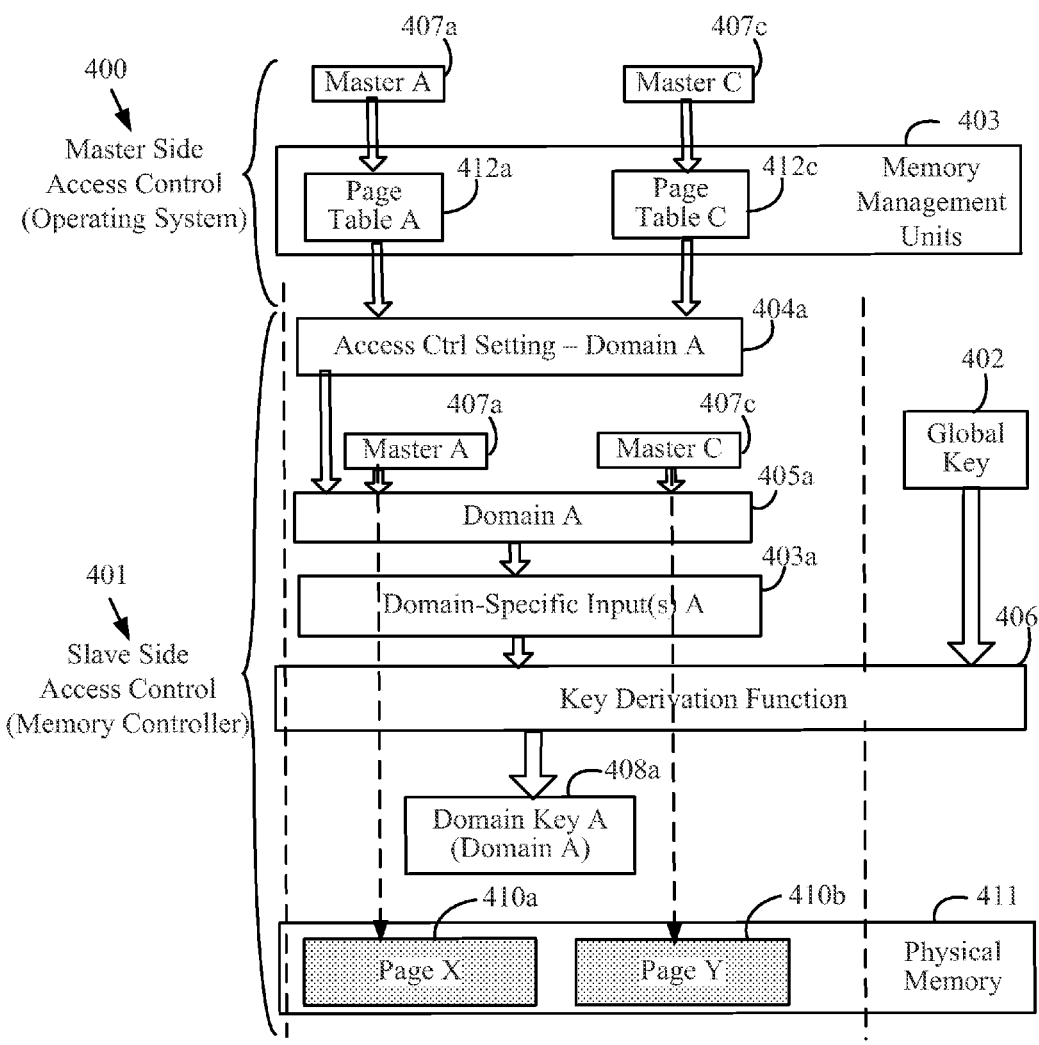
FIG. 4B illustrates a second example of how master side access control and slave side access control may be combined to design a flexible and scalable access control system.

FIG. 4B illustrates a second example of how master side access control 400 and slave side access control 401 may be combined to design a flexible and scalable access control system. In this example, two masters 407a and 407c may be part of the same domain 405a (at the slave side access control), yet these masters 407a and 407c may be limited to a subset of the pages in the memory region 411. For example, at the master side access control 400, a first master 407a may be associated with a first page table A 412a by the memory management unit 403 while a second master 407c may be associated with a different second page table 412c. Even though both the first master 407a and second master 407c are associated with the same domain A 405a by the slave side access control 401, the restrictions imposed by the master side access control 400 may mean that they each may be accessing a different memory page 410a and 410b, respectively, within memory allocated to the domain A 405a within the physical memory 411. Alternatively, the first master 407a and 407c may be limited to different or overlapping subsets of memory pages within the physical memory 411, but not the same set of memory pages.

The master side access control illustrated in FIGS. 4A and 4B may implement virtual address-based access control (e.g., restricting access based on virtual addresses). Additionally, the slave side access control illustrated in FIGS. 4A and 4B implements memory page access control may be implemented (e.g., restricting access based on virtual addresses). Moreover, by using page tables at the master side access control, this permits further partitioning of memory pages for masters within a single domain (as illustrated in FIG. 4B). Such partitioning of memory pages (in physical memory 411) for masters within a single domain may not be achievable with just the slave side access control 401.

Exemplary Methods for Using Domain-Specific Keys

Figure 5A:
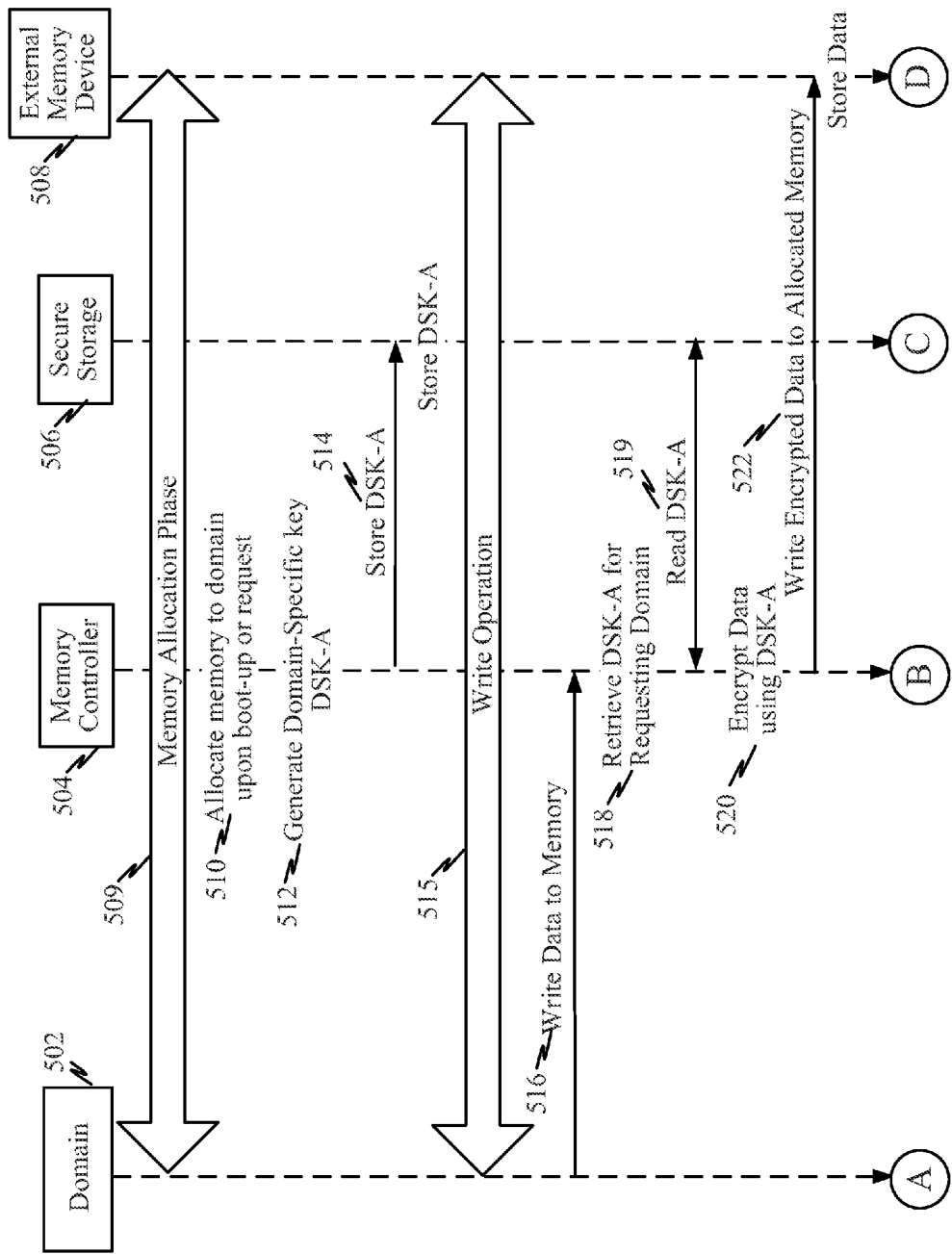
FIGS. 5A and 5B, illustrates how domain-specific keys may be generated and used within a system.
Figure 5B:
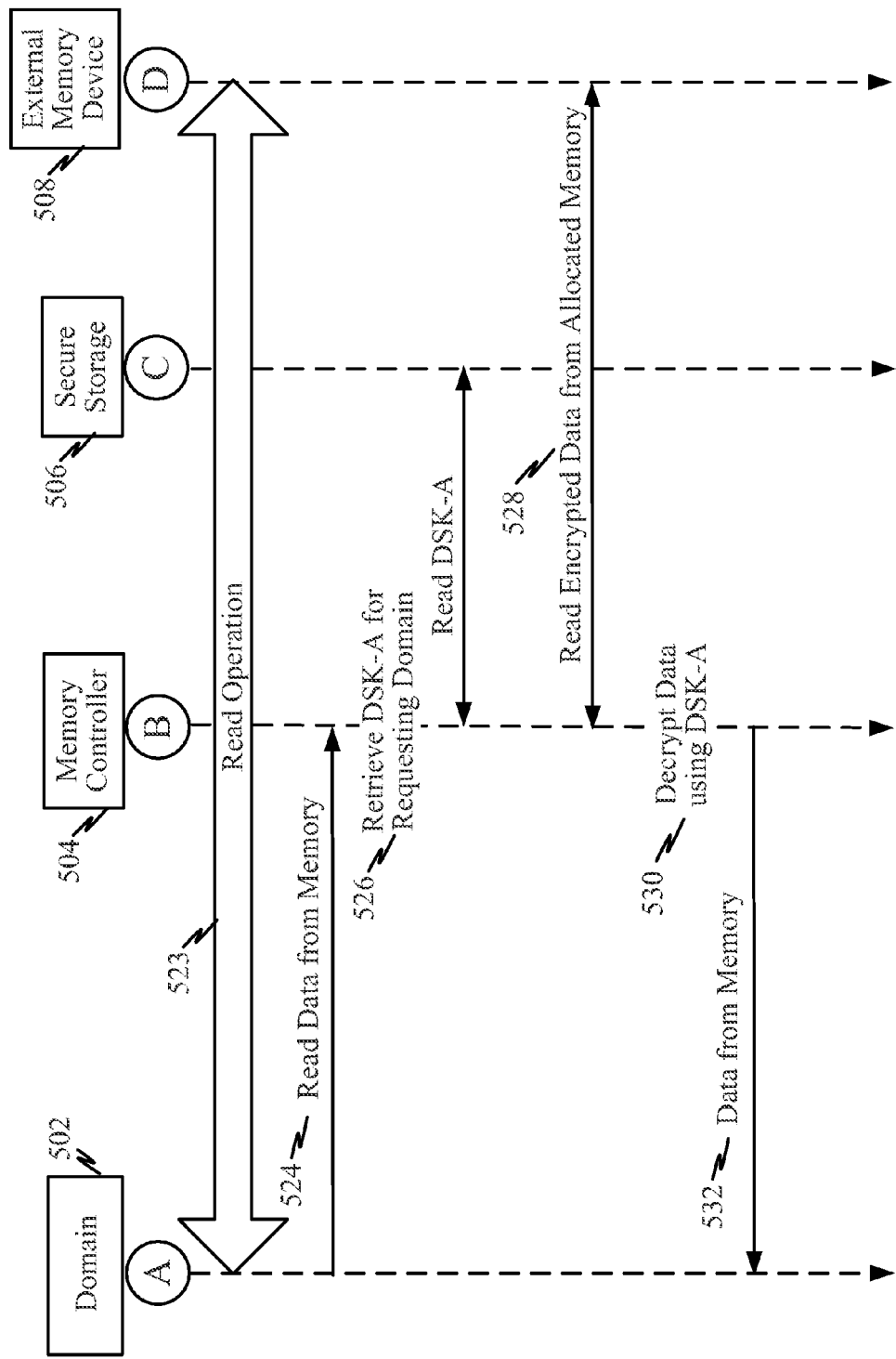

FIG. 5, comprising FIGS. 5A and 5B, illustrates how domain-specific keys may be generated and used within a system. The system may comprise a domain 502 (e.g., hardware module, software, etc.), a memory controller 504, a secure storage 506, and/or an external memory 508. During a memory allocation phase 509 (e.g., during boot-up, reset, and/or upon starting a domain), the memory controller 504 may allocate memory (in the external memory device 508) to the domain 502 upon boot-up, reset, or upon request by the domain 510. The memory controller 504 then generates a domain-specific key DSK-A 512 associated with the domain 502 and stores it 514 in the secure storage device 506.

Subsequently, during a write operation 515, the domain 502 may seek to write data to memory 516. Upon receiving the data, the memory controller 504 may retrieve the domain-specific key DSK-A 518 for the requesting domain 502. The controller 504 then encrypts the data using the domain-specific key DSK-A 520 and writes the encrypted data into the allocated memory 522 where it is stored.

During a read operation 523, the domain 502 may seek to read data from memory 516. Upon receiving the read request 524, the memory controller 504 may retrieve the domain-specific key DSK-A 526 for the requesting domain 502. The controller 504 then reads the encrypted data from the allocated memory 528 where it is stored and decrypts the data using the domain-specific key DSK-A 530. The memory controller 504 then returns the decrypted data 532 to the requesting domain 502.

Figure 6:
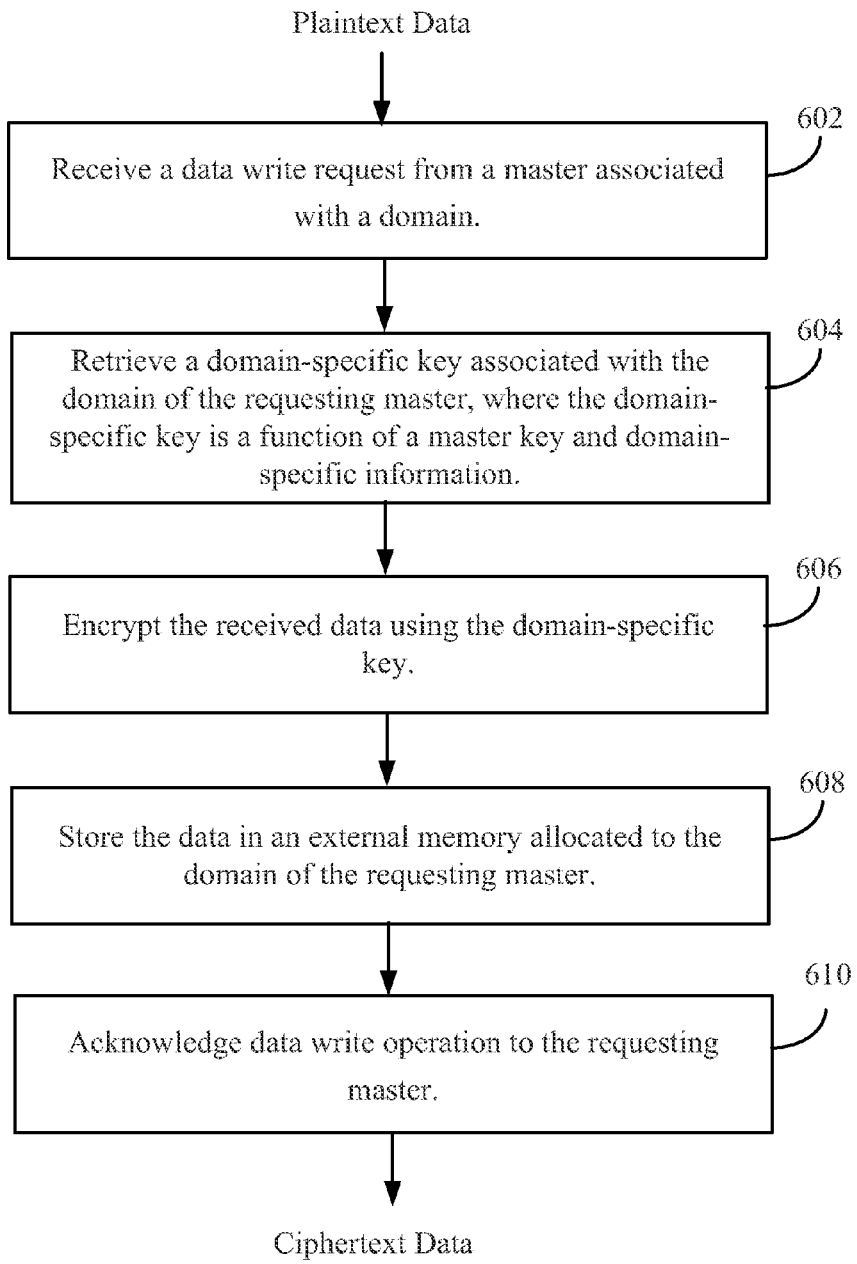
FIG. 6 illustrates a method operational on a memory controller to perform access control with data encryption.

FIG. 6 illustrates a method operational on a memory controller to perform access control with data encryption. The memory controller may receive a data write request from a master associated with a domain 602. In response, the memory controller may retrieve a domain-specific key associated with the domain of the requesting master, where the domain-specific key is a function of a master key (e.g., a global or system key) and domain-specific information 604. The received data is then encrypted, by the memory controller, using the domain-specific key 606. The memory controller then stores the data in an external memory allocated to the domain of the requesting master 608 and acknowledges the data write operation to the requesting master 610.

Figure 7:
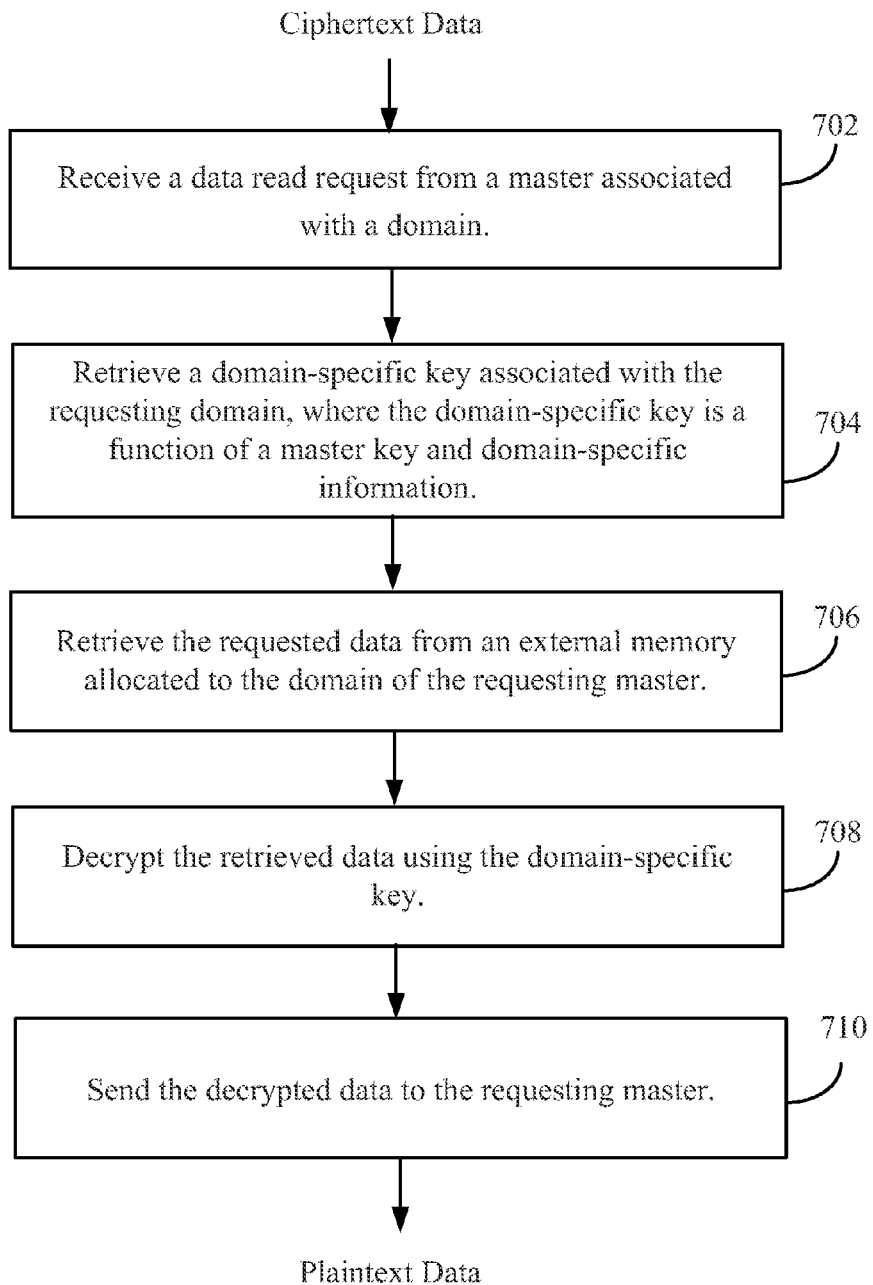
FIG. 7 illustrates a method operational on a memory controller to perform access control with data encryption.

FIG. 7 illustrates a method operational on a memory controller to perform access control with data encryption. The memory controller may receive a data read request from a master associated with a domain 702. In response, the memory controller may retrieve a domain-specific key associated with the domain of the requesting master, where the domain-specific key is a function of a master key (e.g., a global or system key) and domain-specific information 604. The memory controller then retrieves the requested data from an external memory allocated to the domain of the requesting master 706. The retrieved data is then decrypted, by the memory controller, using the domain-specific key 708. The decrypted data is then sent to the requesting master 710.

Figure 8:
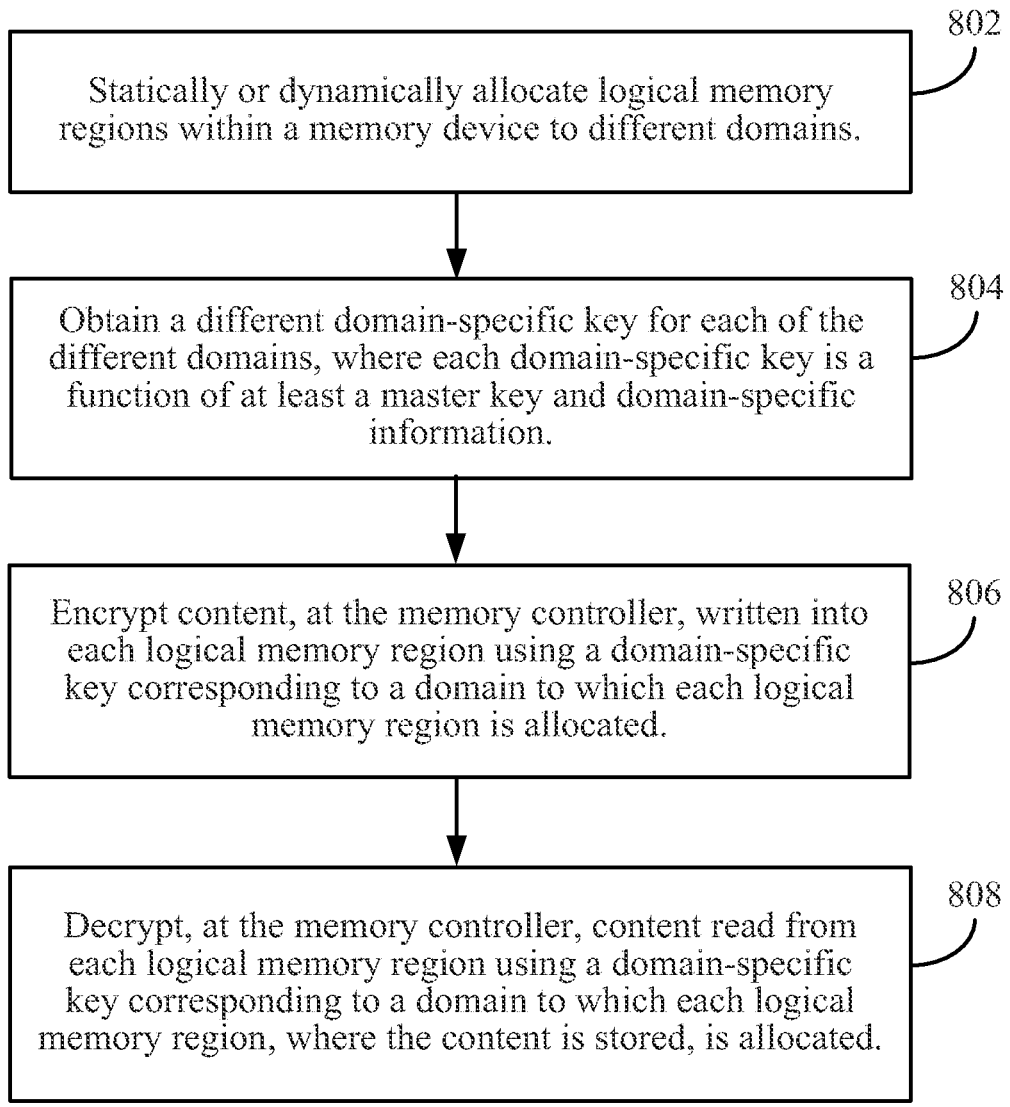
FIG. 8 illustrates a method for access control of allocated memory (e.g., DRAM, flash, etc.).

FIG. 8 illustrates a method for access control of statically or dynamically allocated memory (e.g., DRAM, flash, etc.). In one example, this method may be operational in a memory controller for securing content stored in memory. Logical memory regions within a memory device may be dynamically allocated to different domains 802. A different domain-specific key may be obtained for each of the different domains, where each domain-specific key is a function of at least a master key and domain-specific information 804. Content written into each logical memory region may be encrypted using a domain-specific key corresponding to a master providing the content and to a domain to which the logical memory region is allocated 806. Content read from each memory region may be decrypted using a domain-specific key corresponding to a master requesting the content and to a domain to which the logical memory region, where the content is stored, is allocated 808. In this manner, access to a first logical memory region may be restricted to only a master within a first domain to which the first memory region is allocated.

In various implementations, the domain-specific keys may be dynamically generated or selected from a pre-generated set of keys. In other examples, the domain-specific keys may be generated at the memory controller and/or a secured processor. The domain-specific keys may be automatically changed upon reset of the memory controller. The domain-specific keys may be stored in a secure memory space. In one example, the memory device may be external to the memory controller.

In some instances, a first memory page within a first memory region may be associated with a first domain-specific key and allocated to a first domain and a second page within the first memory region may be associated with a second domain-specific key and allocated to a second domain.

According to one aspect, the memory controller may dynamically reallocate a first logical memory region from a first domain to a second domain, where the first domain and second domain are associated with different domain-specific keys. The reallocation of the first logical memory region from the first domain to the second domain is done without clearing content from the first logical memory region.

According to another aspect, a first domain-specific key may be associated with a first logical memory region and allocated to a first domain and a second domain, the first domain-specific key may be a function of at least a master key, first domain-specific information from the first domain and second domain-specific information from the second domain.

Figure 9:
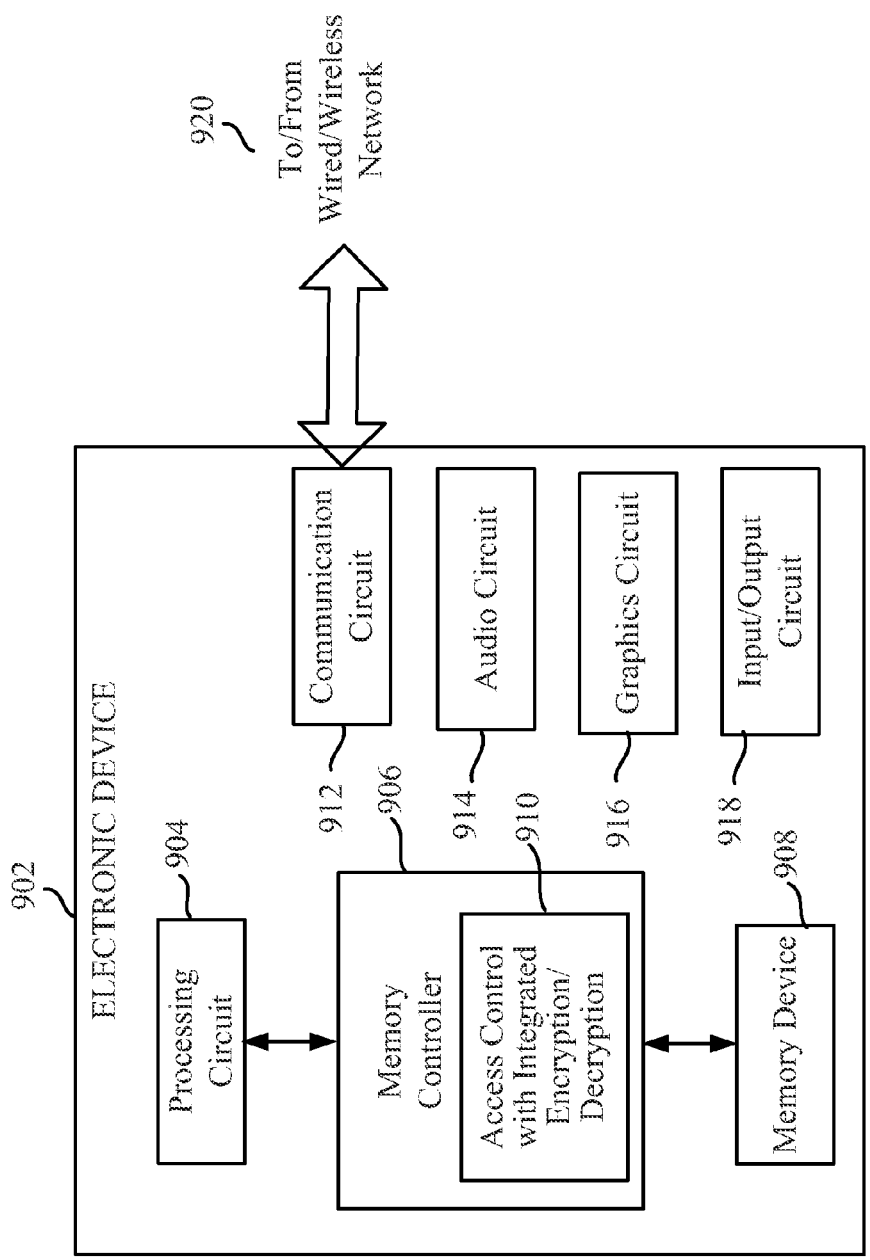
FIG. 9 is a block diagram illustrating an electronic device that includes a memory controller with access control with integrated encryption/decryption.

FIG. 9 is a block diagram illustrating an electronic device that includes a memory controller with access control with integrated encryption/decryption. The electronic device 902 may be a mobile phone, wireless phone, personal digital device, digital table, mobile computing device, laptop computer, digital music player and/or storage device, digital media player and/or storage device, etc. The electronic device 902 may include a processing circuit 904 (e.g., an application processing circuit, a secure processing circuit, etc.), a memory controller 906, a memory device 908, a communication circuit 912, an audio circuit 914, a graphics circuit 916, and/or an input/output circuit 918.

The communication circuit 912 (e.g., modem, transceiver, etc.), audio circuit 914 (e.g., audio signal processor, audio transducer output, microphone input, etc.), graphics circuit 916 (e.g., display device, video signal processor, etc.), and/or an input/output circuit 918 (e.g., keypad, keyboard, universal serial bus interface, etc.) along with applications executed on the processing circuit 904 may be considered "domains". Additionally, one or more of the components of the electronic device, including the memory controller 906, may be part of a single circuit, and integrated semiconductor circuit, and/or a system on a chip. The communication circuit 912 may serve to facilitate communications to/from a wired and/or wireless network 920 (e.g., a subscriber network, a Bluetooth link, etc.).

The memory controller 906 may implement access control with integrated encryption/decryption which encryptions data written sent to memory and decrypts memory read from data using a domain-specific key. In one example, where the domain-specific key is generated by the memory controller 906, the domain-specific keys may be based on a master key and/or domain-specific information. In another example, the domain-specific key may be generated by software (e.g., operating in a secure processing circuit or processor) based on the master key and, optionally, domain-specific information.

One or more of the components, steps, features, and/or functions illustrated in the Figures may be rearranged and/or combined into a single component, step, feature or function or embodied in several components, steps, or functions. Additional elements, components, steps, and/or functions may also be added without departing from the invention. The apparatus, devices, and/or components illustrated in the Figures may be configured to perform one or more of the methods, features, or steps described in the Figures. The algorithms described herein may also be efficiently implemented in software and/or embedded in hardware.

Moreover, in one aspect of the disclosure, the circuit illustrated in FIGS. 1 and 9 may include a specialized processor (e.g., an application specific integrated circuit (e.g., ASIC)) that is specifically designed and/or hard-wired to perform the algorithms, methods, and/or steps described in FIGS. 2, 3, 4, 5, 6, 7, and/or 8. Thus, such a specialized processor (e.g., ASIC) may be one example of a means for executing the algorithms, methods, and/or steps described in FIGS. 2, 3, 4, 5, 6, 7, and/or 8. The processor-readable storage medium may store instructions that when executed by a specialized processor (e.g., ASIC) causes the specialized processor to perform the algorithms, methods, and/or steps described herein.

Also, it is noted that the aspects of the present disclosure may be described as a process that is depicted as a flowchart, a flow diagram, a structure diagram, or a block diagram.

Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method operational within a memory controller for securing content comprising:
   allocating, at the memory controller, logical memory regions within a memory device to different domains, the memory device being external to the memory controller;
   defining, at the memory controller, access permissions within access control settings for one or more masters within a domain, the access permissions specifying at least one of read and/or write access for the one or more masters within the domain;
   obtaining, at the memory controller, a different domain-specific key for each of the different domains, where each domain-specific key is a function of at least a master key and domain-specific information, the domain-specific information including the access permissions that specify at least one of read and/or write access for the one or more masters within the domain;
   storing the domain-specific keys at a secure memory space that is separate from and independent of the memory device;
   updating a domain-specific key stored at the secure memory space when a change to access control settings for one or more masters within a domain is detected; and
   encrypting content, at the memory controller, written into each logical memory region using a domain-specific key corresponding to a domain to which each logical memory region is allocated.

2. The method of claim 1, further comprising:
   decrypting, at the memory controller, content read from each logical memory region using a domain-specific key corresponding to a domain to which each logical memory region, where the content is stored, is allocated.

3. The method of claim 1, further comprising:
restricting access to a first logical memory region to all masters associated with a first domain to which the first memory region is allocated.

4. The method of claim 1, wherein the domain-specific keys are generated or selected from a pre-generated set of keys.

5. The method of claim 1, further comprising:
generating the domain-specific keys at the memory controller or a secured processor.

6. The method of claim 1, wherein a first memory page within a first memory region is associated with a first domain-specific key and allocated to a first domain and a second page within the first memory region is associated with a second domain-specific key and allocated to a second domain.

7. The method of claim 1, further comprising:
dynamically reallocating a first logical memory region from a first domain to a second domain, where the first domain and second domain are associated with different domain-specific keys.

8. The method of claim 7, wherein the reallocation of the first logical memory region from the first domain to the second domain is done without clearing content from the first logical memory region.

9. The method of claim 1, wherein the domain-specific keys are automatically changed upon reset of the memory controller.

10. The method of claim 1, wherein a first domain-specific key is associated with a first logical memory region and allocated to a first domain and a second domain, the first domain-specific key is a function of at least a master key, first domain-specific information from the first domain, and second domain-specific information from the second domain.

11. A memory controller, comprising:
a memory allocation circuit configured to allocate logical memory regions within a memory device to different domains, the memory device being external to the memory controller;
an access control circuit configured to define access permissions within access control settings for one or more masters within a domain, the access permissions specifying at least one of read and/or write access for the one or more masters within the domain;
a domain-specific key generator circuit configured to obtain a different domain-specific key for each of the different domains, where each domain-specific key is a function of at least a master key and domain-specific information, the domain-specific information including the access permissions that specify at least one or read and/or write access for the one or more masters within the domain, and the domain-specific key generator circuit is further configured to store the domain-specific keys at a secure memory space that is separate from and independent of the memory device, and update a domain-specific key stored at the secure memory space when a change to access control settings for one or more masters within a domain is detected; and
a content encryption circuit configured to encrypt content written into each logical memory region using a domain-specific key corresponding to a domain to which each logical memory region is allocated.

12. The memory controller of claim 11, further comprising:
a content decryption circuit configured to decrypt content read from each memory region using a domain-specific key corresponding to a master requesting the content and to a domain to which each logical memory region, where the content is stored, is allocated.

13. The memory controller of claim 11, wherein the access control circuit is further configured to restrict access to a first logical memory region to only a first master associated with a first domain to which the first memory region is allocated.

14. The memory controller of claim 11, wherein the domain-specific keys are dynamically generated or selected from a pre-generated set of keys.

15. The memory controller of claim 11, wherein the domain-specific key generator circuit is further configured to store the domain-specific keys in registers only accessible to the memory controller.

16. The memory controller of claim 11, wherein the domain-specific circuit is configured to generate the domain-specific keys at the memory controller or obtain the domain-specific keys from a secured processor.

17. The memory controller of claim 11, wherein a first memory page within a first memory region is associated with a first domain-specific key and allocated to a first domain and a second page within the first memory region is associated with a second domain-specific key and allocated to a second domain.

18. The memory controller of claim 11, wherein the memory allocation circuit is further configured to dynamically reallocate a first logical memory region from a first domain to a second domain, where the first domain and second domain are associated with different domain-specific keys.

19. The memory controller of claim 18, wherein the reallocation of the first logical memory region from the first domain to the second domain is done without clearing content from the first logical memory region.

20. The memory controller of claim 11, wherein the domain-specific keys are automatically changed upon reset of the memory controller.

21. The memory controller of claim 11, wherein a first domain-specific key is associated with a first logical memory region and allocated to a first domain and a second domain, the first domain-specific key is a function of at least a master key, first domain-specific information from the first domain, and second domain-specific information from the second domain.

22. A memory controller, comprising:
means for allocating logical memory regions within a memory device to different domains, the memory device being external to the memory controller;
means for defining access permissions within access control settings for one or more masters within a domain, the access permissions specifying at least one of read and/or write access for the one or more masters within the domain;
means for obtaining a different domain-specific key for each of the different domains, where each domain-specific key is a function of at least a master key and domain-specific information, the domain-specific information including the access permissions that specify at least one of read and/or write access for the one or more masters within the domain;
means for storing the domain-specific keys at a secure memory space that is separate from and independent of the memory device;

means for updating a domain-specific key stored at the secure memory space when a change to access control settings for one or more masters within a domain is detected; and means for encrypting content written into each logical memory region using a domain-specific key corresponding to a domain to which each logical memory region is allocated.

23. The memory controller of claim 22, further comprising:

means for decrypting content read from each memory region using a domain-specific key corresponding to a domain to which each logical memory region, where the content is stored, is allocated.

24. A non-transitory machine-readable storage medium having instructions stored thereon which when executed by at least one processor within a memory controller causes the at least one processor to:

allocate logical memory regions within a memory device to different domains, the memory device being external to the memory controller;

define access permissions within access control settings for one or more masters within a domain, the access permissions specifying at least one of read and/or write access for the one or more masters within the domain;

obtain a different domain-specific key for each of the different domains, where each domain-specific key is a function of at least a master key and domain-specific information, the domain-specific information including the access permissions that specify at least one of read and/or write access for the one or more masters within the domain;

store the domain-specific keys at a secure memory space that is separate from and independent of the memory device;

update a domain-specific key stored at the secure memory space when a change to access control settings for one or more masters within a domain is detected; and encrypt content written into each logical memory region using a domain-specific key corresponding to a domain to which each logical memory region is allocated.

25. The method of claim 1, wherein the secure memory space is located within an integrated circuit that includes the memory controller.

26. The method of claim 1, wherein the secure memory space is inaccessible to a user controlled application.

27. The memory controller of claim 11, wherein the secure memory space is located within an integrated circuit that includes the memory controller.

28. The memory controller of claim 22, wherein the secure memory space is located within an integrated circuit that includes the memory controller.

29. The non-transitory machine-readable storage medium of claim 24, wherein the secure memory space is located within an integrated circuit that includes the memory controller.

* * * * *